United States Patent
Nair et al.

(10) Patent No.: US 9,288,667 B2
(45) Date of Patent: Mar. 15, 2016

(54) ALLOCATING NETWORK IDENTIFIERS TO ACCESS TERMINALS

(75) Inventors: Suresh P. Nair, Whippany, NJ (US); Peretz Feder, Englewood, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 269 days.

(21) Appl. No.: 13/150,321

(22) Filed: Jun. 1, 2011

(65) Prior Publication Data

US 2011/0310822 A1    Dec. 22, 2011

Related U.S. Application Data

(60) Provisional application No. 61/356,826, filed on Jun. 21, 2010, provisional application No. 61/356,861, filed on Jun. 21, 2010.

(51) Int. Cl.

| | | |
|---|---|---|
| *H04W 4/00* | (2009.01) | |
| *H04W 68/00* | (2009.01) | |
| *H04W 8/26* | (2009.01) | |
| *H04W 28/06* | (2009.01) | |
| *H04W 88/02* | (2009.01) | |
| *H04W 8/22* | (2009.01) | |
| *H04W 76/02* | (2009.01) | |

(52) U.S. Cl.
CPC ............... *H04W 8/26* (2013.01); *H04W 28/06* (2013.01); *H04W 8/22* (2013.01); *H04W 76/021* (2013.01); *H04W 88/02* (2013.01)

(58) Field of Classification Search
CPC ...... H04W 6/00; H04W 76/021; H04W 72/04
USPC .......................................... 370/277, 310–349
See application file for complete search history.

(56) References Cited

U.S. PATENT DOCUMENTS

| | | | |
|---|---|---|---|
| 8,315,668 B2 | 11/2012 | Watanabe et al. | |
| 8,743,770 B2 * | 6/2014 | Frederiksen | H04B 7/2606 370/315 |
| 8,849,317 B2 * | 9/2014 | Nair | H04W 68/00 370/328 |
| 2002/0045435 A1 * | 4/2002 | Fantaske | 455/403 |

(Continued)

FOREIGN PATENT DOCUMENTS

| | | |
|---|---|---|
| CN | 101494851 | 7/2009 |
| CN | 101534500 | 9/2009 |

(Continued)

OTHER PUBLICATIONS

International Search Report PCT/US2011/040799 dated Sep. 29, 2011.

(Continued)

*Primary Examiner* — Hanh N Nguyen
(74) *Attorney, Agent, or Firm* — Davidson Sheehan LLP

(57) ABSTRACT

The disclosed subject provides embodiments of a method of allocating network identifiers to access terminals. One embodiment of the method includes allocating a fixed length identifier to an access terminal on initial entry of the access terminal to a network. The access terminal is identified by one of a plurality of mode-dependent identifiers in communication over an air interface between the access terminal and the network. The mode-dependent identifier is selected based on an operational mode of the access terminal. The method also includes providing the fixed length identifier to one or more entities in the network.

19 Claims, 7 Drawing Sheets

(56) References Cited

U.S. PATENT DOCUMENTS

| | | | |
|---|---|---|---|
| 2002/0114340 A1* | 8/2002 | Kumazawa et al. | 370/412 |
| 2004/0100924 A1* | 5/2004 | Yam | 370/328 |
| 2004/0148396 A1* | 7/2004 | Meyer et al. | 709/227 |
| 2006/0039316 A1* | 2/2006 | Ogushi | 370/328 |
| 2007/0294459 A1* | 12/2007 | Chen | 710/315 |
| 2008/0102865 A1* | 5/2008 | Mohanty et al. | 455/466 |
| 2009/0059849 A1* | 3/2009 | Namba et al. | 370/328 |
| 2009/0257350 A1* | 10/2009 | Bugenhagen | 370/235 |
| 2009/0296699 A1* | 12/2009 | Hefty | 370/389 |
| 2011/0219141 A1* | 9/2011 | Coile et al. | 709/235 |
| 2012/0188935 A1* | 7/2012 | Frederiksen et al. | 370/315 |
| 2014/0010223 A1* | 1/2014 | Wang | H04W 76/021 370/338 |

FOREIGN PATENT DOCUMENTS

| | | |
|---|---|---|
| CN | 101610504 | 12/2009 |
| JP | H1168846 | 3/1999 |
| WO | 2010028684 A1 | 3/2010 |

OTHER PUBLICATIONS

Written Opinion dated Sep. 29, 2011.

"3$^{rd}$ Generation Partnership Project; Technical Specification Group Core Network and Terminals; Numbering, addressing and identification (release 9)" 3GPP Standard; 3GPP TS 23.003, 3$^{rd}$ Generation Partnership Project (3GPP), Mobile Competence Centre; 650, Route Des Lucioles; F-06921 Sophia-Antipolis Cedex; France, No. V9.3.0, Jun. 15, 2010, pp. 1-76, XP050441738, [retrieved on Jun. 15, 2010] sections 2.1, 2.2, 2.8.1, 2.8.2.1.2, 2.8.2.1.3.

"3$^{rd}$ Generation Partnership Project; Technical Specification Group Services and System Aspects; Security related network functions (Release 9)" 3GPP Standard, 3GPP TS 43.020, 3$^{rd}$ Generation Partnership Project (3GPP), Mobile Competence Centre; 650, Route Des Lucioles; F-06921 Sophia-Antipolis Cedex; France, No. V9.1.0, Dec. 18, 2009, pp. 1-110, XP050401370, [retrieved on Dec. 18, 2009] section 2.2.

"3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 10)" 3GPP Standard, 3GPP TS 23.401, 3$^{rd}$ Generation Partnership Project (3GPP) Mobile Competence Centre; 650, Route Des Lucioles; F-06921 Sophia-Antipolis Cedex, France, No. V10.0.0, Jun. 10, 2010, pp. 1-261, XP050441572.

IEEE: "P802.16m/D6, May 2010 IEEE Draft Amendment Standard for Local and Metropolitan Area Networks—Part 16; Air Interface for Fixed and Mobile Broadband Wireless Access Systems—Advanced Air Interface", Internet Citation, May 22, 2010, pp. 1-225, XP002611647, retrieved from the Internet: URL:http://ieeexplore.ieee.org/servlet/opac?punumber=5510225 [retrieved on Nov. 26, 2010] sections 16.2.1, 16.2.15.6, 16.2.3.1, 16.2.3.2, 16.2.3.7, 16.2.3.8, 16.2.3.47.

Roshni Srinivasan et al., "Updates to the IEEE 802.16m System Description Document (SDD)", IEEE 802.16 Broadband Wireless Access Working Group, May 13, 2010.

"Digital Cellular Telecommunications System (Phase 2+); Universal Mobile Telecommunications System (UMTS); Numbering, addressing and identification (3GPP TS 23.003 version 9.1.0 Release 9)", ETSI TS 123 003, Jan. 31, 2010, 75 pages.

K.S. Keshava Murthy, "Analysis of Combining WiMAX and LTE Gateway Functions", International Multimedia Services Architecture and Applications, 2nd International Conference, Dec. 12, 2008, 6 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 9)", 3GPP TS 36.300, Jun. 17, 2010, 171 pages.

2nd Office Action mailed Sep. 28, 2015 for corresponding CN Application No. 2011800305697, 3 pages.

* cited by examiner

ALLOCATING NETWORK IDENTIFIERS TO ACCESS TERMINALS

CROSS REFERENCE TO RELATED APPLICATIONS

This application claims the benefit of the filing date of U.S. Provisional Application Ser. No. 61/356,826, filed Jun. 21, 2010, entitled "Method for Managing IEEE 802.16m Advanced MS States and Identifiers in a Wireless Network."

This application is related to U.S. patent application Ser. No. 13/150,307 filed on Jun. 1, 2011, which claims the benefit of the filing date of U.S. Provisional Application Ser. No. 61/356,861, filed Jun. 21, 2010, entitled "Method for IEEE 802.16m Paging Operation in Networks Simultaneously Supporting Legacy and Advanced Mss."

BACKGROUND

The disclosed subject matter relates generally to communication systems, and, more particularly, to wireless communication systems.

Conventional wireless communication systems use a network of base stations or other access nodes to provide wireless connectivity to a large and often mobile population of access terminals. Each access terminal can be identified to the wireless communication system by an identifier that is permanently assigned or "burned in" to the mobile unit. For example, implementations of WiMAX release 1 that are based on the standards and protocols defined by IEEE 802.16e (2009) use a constant 48-bit mobile station identifier (MS-ID) to identify the access terminals in the network. The MS-ID is typically installed or programmed by the manufacturer of the access terminal in the form of media access control (MAC) identifier. For another example, wireless communication systems that operate according to the Global System for Mobile communications (GSM) and/or Universal Mobile Telecommunication Services (UMTS) standards and/or protocols may use a 64-bit International Mobile Subscriber Identity (IMSI) to identify each mobile unit or access terminal The conventional mobile station identifier is used to identify the access terminal within the network and over the air. For example, the mobile station identifier can be included in headers of messages that are transmitted within the network such as messages transmitted over the R6 network interfaces between base stations and access serving network gateways (ASN-GWs), over R3 network interface between the ASN-GW and the AAA server, over the R8 network interfaces between two neighboring base stations, over the R4 interfaces between two ASN-GWs, and the like. For another example, access terminals can be paged over the air by transmitting a hashed value derived from the identifier, e.g., a 24-bit hash of a 48-bit identifier can be used to page access terminals. The mobile station identifier can also be used directly as a pointer to the mobile station context information stored at one or more network nodes that are involved in a particular call associated with a particular mobile station state.

Access terminals can also be associated with different identifiers in different circumstances. For example, WiMAX networks that operate according to IEEE 802.16m standards and/or protocols may identify access terminals using a set of identification numbers that range in length from 10 bits to 72 bits depending on the operational state of the access terminal Consequently, the identifier that is used by the network and over the air varies as the operational mode changes, e.g., as the access terminal performs initial network entry, gets fully authenticated and active and then shifts between sleeping, dormant, idle, active, or other operational states. The wireless communication system must therefore maintain awareness of the appropriate value of the identifier used to identify the access terminal in over the air messages as well as messages exchanged within the network such as messages transmitted over the R3, R4, R6, R8 and other interfaces. Managing the various identifiers is further complicated by the presence of both legacy access devices that use a single constant identifier such as the 48-bit mobile station identifier and advanced access devices that use a set of identification numbers.

SUMMARY

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for allocating network identifiers to access terminals. One embodiment of the method includes allocating a fixed length identifier to an access terminal on initial entry of the access terminal to a network. The access terminal is identified by one of a plurality of mode-dependent identifiers in communication over an air interface between the access terminal and the network. The mode-dependent identifier is selected based on an operational mode of the access terminal. The method also includes providing the fixed length identifier.

In another embodiment, a method is provided for transmitting messages over an air interface. One embodiment of the method includes receiving a message from a network. The message includes a header containing a fixed length identifier associated with an access terminal This embodiment also includes mapping the fixed length identifier to one of a plurality of mode-dependent identifiers associated with the access terminal The mode-dependent identifier is selected based upon an operational mode of the access terminal This embodiment further includes transmitting information in the message over an air interface towards the access terminal using the selected mode-dependent identifier.

In yet another embodiment, a method is provided for transmitting messages that include access terminal information to a network entity. One embodiment of the method includes receiving a message over an air interface from an access terminal. The message includes a header that contains one of a plurality of mode-dependent identifiers associated with the access terminal. The mode-dependent identifier is selected based upon an operational mode of the access terminal. This embodiment also includes mapping the mode-dependent identifier to a fixed length identifier associated with the access terminal and transmitting information in an associated message to one or more entities in the network using the fixed length identifier to identify the access terminal

BRIEF DESCRIPTION OF THE DRAWINGS

The disclosed subject matter may be understood by reference to the following description taken in conjunction with the accompanying drawings, in which like reference numerals identify like elements, and in which.

Figure 1:
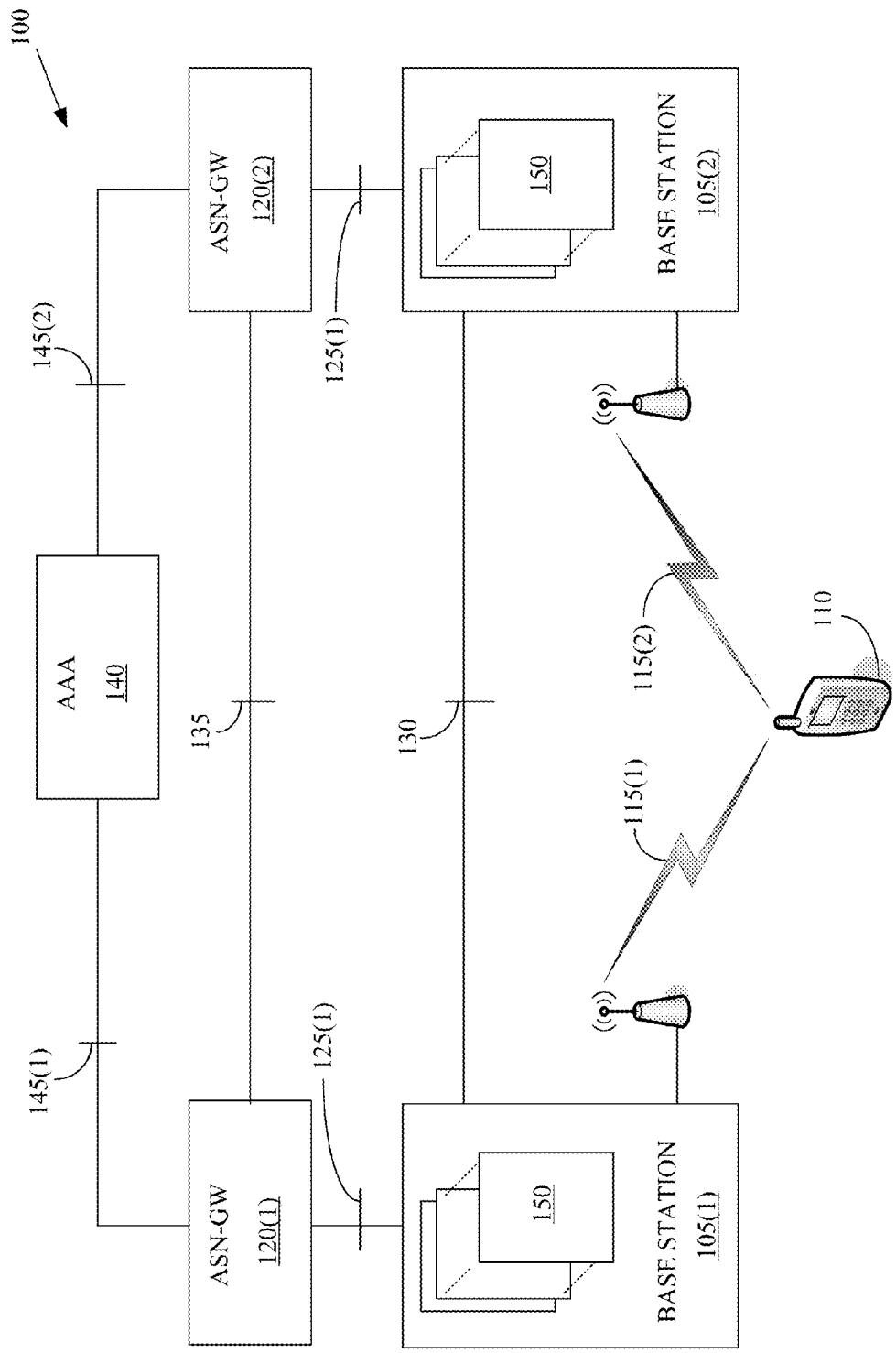
FIG. 1 conceptually illustrates one exemplary embodiment of a wireless communication system.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the described embodiments with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Evolving wireless communication systems allow access terminals to be identified in messages transmitted over the air interface using mode-dependent identifiers that can be selected based on the operational mode of the access terminal Although there are advantages to using different mode-dependent identifiers of different lengths for communication over the air interface, identifying the access terminal using different identifiers in different situations makes it extremely difficult for entities in the core and/or access network (e.g., base stations, access serving gateways, or authentication, authorization, and accounting (AAA) servers) to keep track of the appropriate identifier. For example, the network would be required to monitor the state of each access terminal and adjust its identifier in response to any changes. Supporting the different identifiers would also require significant changes in the format of the message headers used between the network interfaces. Furthermore, the evolving network cannot completely switch to a new identifier scheme because the network needs to be able to support the conventional constant MSID used by legacy devices.

At least in part to address these concerns for evolving wireless networks, the present application describes embodiments of techniques that can be used to define a fixed length identifier that identifies access terminals within the core and/or access network. Embodiments of these techniques may be used to assign identifiers or pseudo-identifiers to access terminals that use mode-dependent identifiers. For example, access terminals that operate according to IEEE 802.16m can select an identifier from a group of mode-dependent identifiers for use over the air interface depending upon the operational mode of the access terminal An access node (or other entity within the network) may assign a fixed length identifier to the access terminal upon initial network entry. For example, the fixed length identifier may be an identifier that includes 48 bits to correspond to the number of bits in a legacy mobile station identifier (MS-ID) or media access control identifier (MAC-ID). The fixed length identifier is then used to identify the access terminal during communication within the network, e.g., in messages transmitted over the interfaces between different core and/or access network entities. The access node can map or translate between the fixed length identifier and the mode-dependent identifiers so that the appropriate mode-dependent identifier may still be used for communication over the air interface.

FIG. 1 conceptually illustrates one exemplary embodiment of a wireless communication system 100. In the illustrated embodiment, the wireless communication system 100 includes a plurality of access nodes 105 such as base stations that are used to provide wireless connectivity. Access terminals 110 such as mobile units can access the wireless communication system 100 over air interfaces 115 between the access terminals 110 and the access node 105. The access nodes 105 and the access terminals 110 depicted in FIG. 1 operate according to WiMAX standards and/or protocols such as the standards and/or protocols defined by IEEE 802.16m. However, persons of ordinary skill in the art having benefit of the present disclosure should appreciate that alternative embodiments of the wireless communication system 100 may include access nodes and/or access terminals that operate according to other standards and/or protocols. For example, the access nodes 105 and/or the access terminals 110 may support wireless communication according to one or more legacy standards and/or protocols. Moreover, alternate embodiments of the techniques described herein may be implemented in other types of systems and/or devices that use wireless communication techniques.

In the illustrated embodiment, the base stations 105 are communicatively coupled to one or more access serving network gateways (ASN-GWs) 120 over interfaces 125. For example, the interfaces 125 may be R6 network interfaces that operate according to the WiMAX standards and/or protocols. The gateways 120 may be used to support backhaul connections to the base stations 105 and to support mobility-related operations such as handover decisions and/or load balancing, among other functions. The base stations 105 may communicate with each other over interfaces 130 such as R8 interfaces that operate according to the WiMAX standards and/or protocols. The ASN-GWs 120 may communicate with each other over interfaces 135 such as R4 interfaces that operate according to the WiMAX standards and/or protocols. The ASN-GWs 120 may communicate with an AAA server 140 over interfaces 145 such as R3 interfaces that operate according to the WiMAX standards and/or protocols. In various embodiments, the AAA server 140 provides Internet Protocol (IP) functionality to support the functions of authentication, authorization and accounting. Authentication refers to the process where an entity's identity is authenticated, typically by providing evidence that it holds a specific digital identity such as an identifier and the corresponding credentials. The authorization function determines whether a particular entity is authorized to perform a given activity, typically inherited from authentication when logging on to an application or service. Accounting refers to the tracking of network resource consumption by users for the purpose of capacity and trend analysis, cost allocation, and/or billing.

Access terminal 110 can be identified over the air interfaces 115 using different mode-dependent identifiers. As used herein, the term "mode-dependent identifier" is used to indicate that the different identifiers that may be selected to identify each access terminal 110 are used to identify the access terminal 110 in different operational modes. In one embodiment, the mode-dependent identifiers have different lengths. For example, identifiers of 10 bits, 12 bits, 18 bits, 24 bits, 48 bits, or 72 bits may be used as one or more of the mode-dependent identifiers. In one embodiment, the set of mode-dependent identifiers is defined by the relevant standards and/or protocols. For example, the IEEE 802.16m standards and/or protocols may define the set of available mode-dependent identifiers in the manner indicated in Table 1. However, persons of ordinary skill in the art having benefit of the present disclosure should appreciate that the particular set of mode-dependent identifiers shown in Table 1 is intended to be exemplary and other sets may be defined for alternative embodiments.

TABLE 1

| ID NAME | LENGTH | DESCRIPTION |
| --- | --- | --- |
| MAC ID | 48 bits | When it is used in header |
| STID Station ID | 12 bits | Used when MS is connected |
| TSTID Temporary Station ID | 12 bits | Used until STID is allocated |
| DID De-registration ID | 18 bits | Used when MS is in idle mode |
| CRID Context Retention ID | 72 bits | Assigned during initial network entry |
| MSTID Multicast Station ID | 12 bits | Identifies multicast broadcast flows with Flow ID |

Embodiments of the base stations 105 may be configured to allocate fixed length identifiers to the access terminals 110. The fixed length identifier may be used to identify the access terminal 110 in communications between network elements such as messages transmitted over the interfaces 125, 130, 135, 145. In one embodiment, the base station 105 allocates the fixed length identifier upon initial network entry of the access terminal 110. The length of the fixed length identifier may be chosen to correspond to the number of bits used to identify legacy access terminals. For example, the base station 105 may allocate a 48 bit identifier to the access terminal 110 so that the number of bits in the fixed length identifier corresponds to the 48 bits in a conventional mobile station identifier or MAC-ID. When the same number of bits is used for the fixed length identifier and the conventional mobile station ID, existing network message formats (and other standardized network functionality) may be used for both legacy access terminals and access terminals 110 that use mode-dependent identifiers over the air interface. In one embodiment, the fixed length identifier is used to point to context information associated with the access terminal 110 and stored within the network 100.

A database may be used to store information indicating the relationship and/or mapping between the fixed length identifier and the mode-dependent identifiers associated with the access terminal 110. In the illustrated embodiment, the base stations 105 can store database entries 150 including mapping information for the identifiers associated with the access terminals 110. This information can then be used to translate or map fixed length identifiers into mode-dependent identifiers and vice versa during uplink and/or downlink communications between the network 100 and the access terminal 110. Although portions of copies of the database 150 are depicted within the base stations 105, persons of ordinary skill in the art having benefit of the present disclosure should appreciate that alternative embodiments of the wireless communication system 100 may be able to maintain the database 150 in any location such as ASN-GW 120 or collection of locations.

Figure 2:
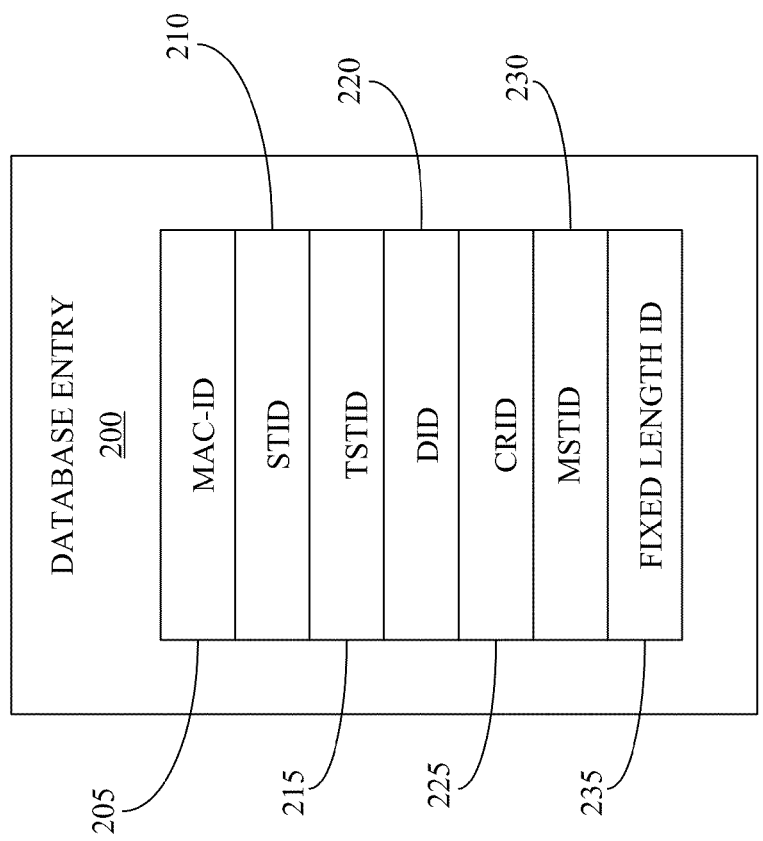
FIG. 2 conceptually illustrates one exemplary embodiment of a database entry.

FIG. 2 conceptually illustrates one exemplary embodiment of a database entry 200. In the illustrated embodiment, the database entry 200 includes various fields for storing information indicating the different mode-dependent and/or fixed length identifiers associated with one access terminal For example, a field 205 is used to store information indicating the media access control identifier (MAC-ID) that is permanently associated with the access terminal Field 210 is used to store the station identifier (STID) that is used to identify the access terminal when it is in the active operational mode and connected to the network. Field 215 is used to store the temporary station identifier (TSTID) that identifies the access terminal prior to the station identifier being allocated to the access terminal Field 220 includes the de-registration identifier (DID) that is used to identify the access terminal when it is coming out of a long inactive operational mode or if radio connection was lost. Field 225 includes the context retention identifier (CRID) that is assigned to the access terminal during initial network entry. Field 230 includes a multicast station identifier (MSTID) that can identify multicast/broadcast service flows associated with the access terminal when the access terminal is operating in a multicast/broadcast mode. Field 235 includes the fixed length identifier that is allocated to the access terminal, e.g., during initial network entry, and used to identify the access terminal during communication within the core and/or access network.

Figure 3:
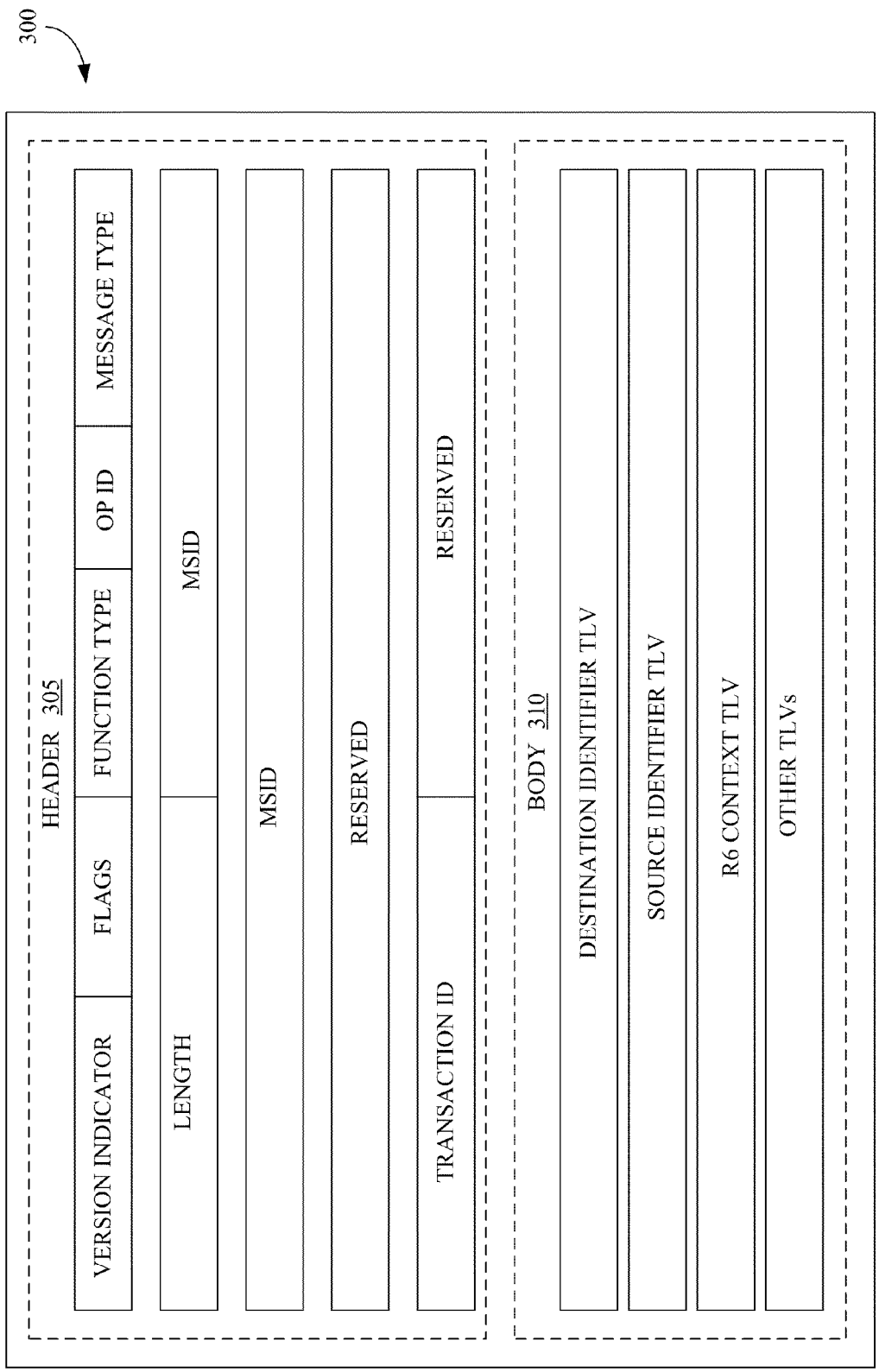
FIG. 3 conceptually illustrates one exemplary embodiment of a message format.

FIG. 3 conceptually illustrates one exemplary embodiment of a message format 300. In the illustrated embodiment, the message format 300 includes a message header 305 and a message body 310. The message header 305 includes fields that are used to define various parameters of the message 300 and/or to identify the access terminal associated with the message. In the illustrated embodiment, the message header 305 includes fields for a version indicator, a set of flags, a function type for the message, an operand identifier (OP ID), and a message type. For example, the version indicator may be one byte long and bit 7 may be set to 1 by the sender. Bits 0-6 of the version indicator may be set to 0 by the sender. The receiver may ignore the values in this field. The flag field may include a variety of flags such as a restart flag that indicates whether a restart is expected for the next transaction identifier, a bit that indicates whether the message is sent in the relay mode of operation, bits used to identify legacy nodes, and a comprehension bit that indicates whether comprehension is required for fields such as the function type field, a message type field, or the OP ID field.

The message header 305 may also include fields that are used to indicate the length of the message, an identifier of the associated access terminal (MSID), a transaction identifier, and one or more reserved fields. In the illustrated embodiment, the access terminal identifier has a fixed length that corresponds to the length of the identifiers used for legacy devices, such as the 48-bit mobile station identifier or MAC-ID. Allocating a fixed length identifier to each access terminal for core and/or access network-side communication of the message header 305 may therefore permit embodiments of the message header 305 to be used for messages transmitted over the network interfaces for either legacy access terminals or access terminals that use mode-dependent identifiers for communication over the air interface. For example, access terminals that operate according to IEEE 802.16m may use network message formats defined by previous WiMAX standards and/or protocols.

The message body 310 includes fields such as type-length-value (TLV) fields that are used to carry information included in the message 300. In the illustrated embodiment, the message body 310 includes a destination identifier TLV that includes information identifying the destination of the message 300, a source identifier TLV that includes information identifying the source of the message 300, an R6 context TLV that includes information defining the context for the R6 interface, and other TLVs that may optionally be included in the message 300 to carry other information. In one embodiment, one or more of the other TLVs may be used to carry information indicating the actual mobile station ID or MAC-ID of the access terminal, e.g., in downlink messages that include the previously allocated fixed length identifier in the message header 305. Mode-dependent identifiers used by the access terminals may be indicated in the body of the relevant messages as type-length-values.

Figure 4:
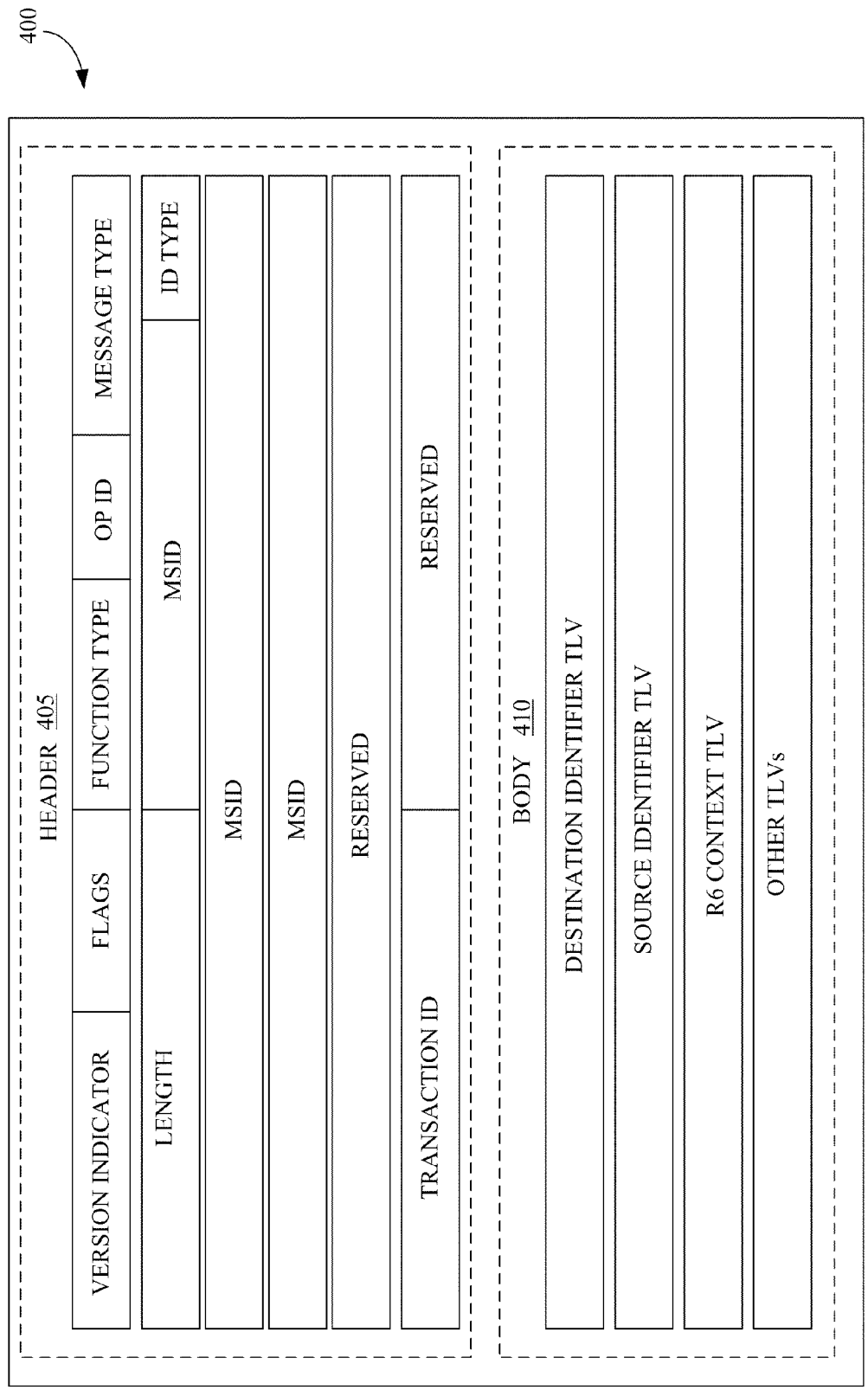
FIG. 4 conceptually illustrates one alternative embodiment of a message format.

FIG. 4 conceptually illustrates one alternative embodiment of a message format 400. In the alternative embodiment, the message format 400 includes a message header 405 and a message body 410. The alternative embodiments of the message format 400 may be used to support mode-dependent identifiers during communication within the network, e.g., in messages transmitted over the interfaces between network entities. Consequently, the message format 400 is able to indicate which of the mode-dependent identifiers are being used to identify the access terminal within the network. The message format 400 also includes information indicating the mode-dependent identifier.

The alternative embodiment of the message header 405 includes fields that are used to define various parameters of the message 400 and/or to identify the access terminal associated with the message. The message header 405 includes fields for a version indicator, a set of flags, a function type for the message, an operand identifier (OP ID), and a message type. The message header 405 may also include fields that are used to indicate the length of the message, an identifier of the associated access terminal (MSID), a transaction identifier, and one or more reserved fields. The alternative embodiment depicted in FIG. 4 differs from the embodiment shown in FIG. 3 because it includes a larger field to accommodate a potentially larger identifier. In particular, the MSID field is selected to be able to accommodate the longest identifier in a variable set of identifiers, such as the 72 bit CRID defined by the WiMAX standards. The message header 405 also includes an identifier type (ID TYPE) field to indicate which of the mode-dependent set of identifiers is being used in the header 405.

Figure 5:
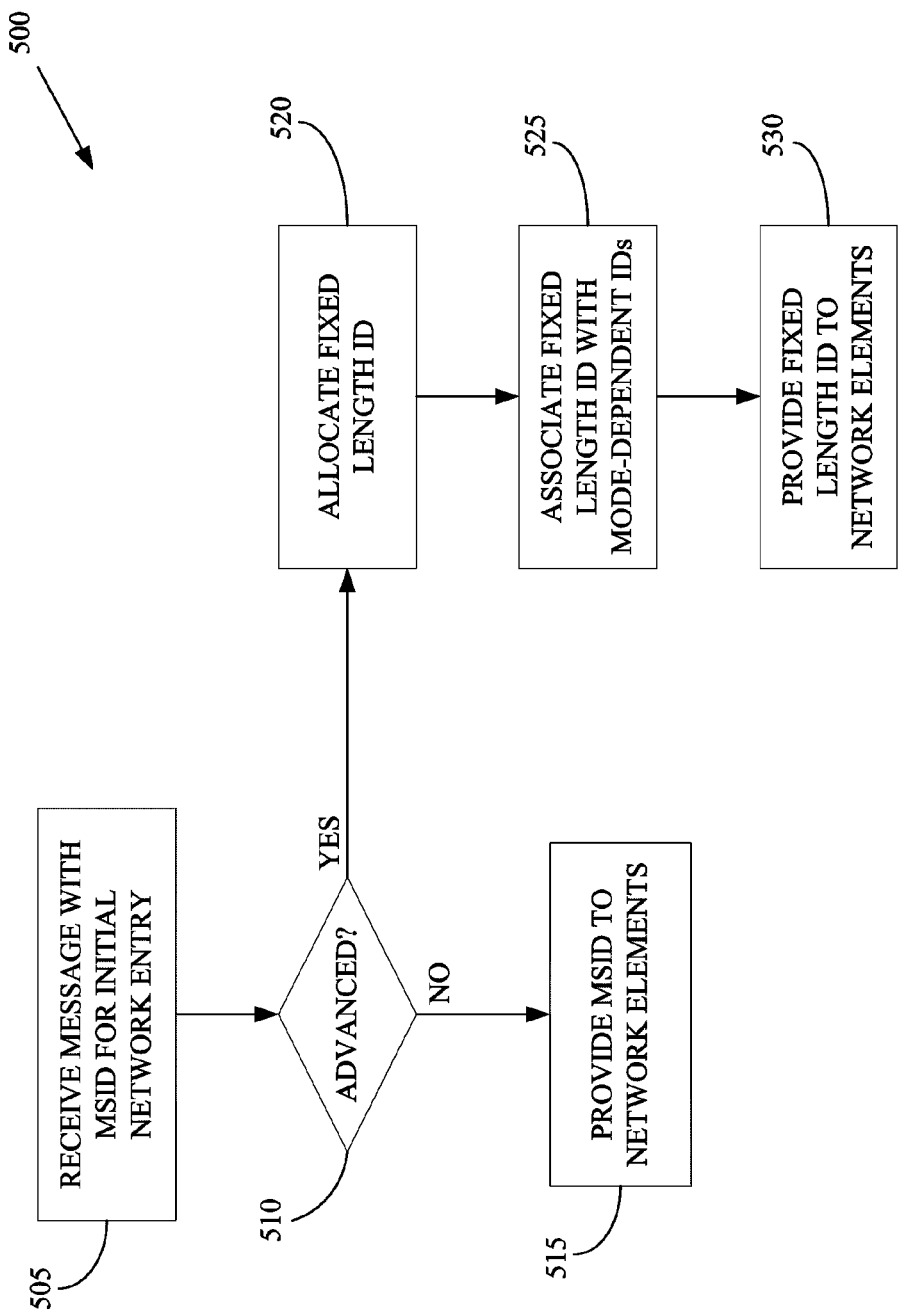
FIG. 5 conceptually illustrates one exemplary embodiment of a method for allocating fixed length identifiers to access terminals.

In the alternative embodiment, the access terminal may be identified within the network using the mode-dependent identifier that is selected based on the operational mode of the access terminal However, the alternative embodiment has a number of disadvantages relative to embodiments that use a fixed length identifier to identify the access terminal within the network. For example, message construction and/or decoding techniques used by current implementations of network elements such as base stations, ASN-GWs, and the like would need to be modified to support the alternative embodiments of the message format 400. For another example, the network would need to be modified to identify legacy access terminals that use conventional message formats such as the message format 300 and advanced access terminals that use the message format 400. For yet another example, providing support for procedures that identify access terminals using the mode-dependent identifier may be difficult at least in part because the identifier changes based on the operational mode of the access terminal FIG. 5 conceptually illustrates one exemplary embodiment of a method 500 for allocating fixed length identifiers to access terminals. In the illustrated embodiment, an entity in the network such as a base station or other access nodes such as ASN-GW or core network nodes receives (at 505) a message during initial network entry of an access terminal The received message includes information indicating the identity of the access terminal In one embodiment, the identity of the access terminal is indicated using the true or permanent mobile station identifier, e.g., the 48 bit identifier that is given to the access terminal when it is manufactured and/or configured. The network entity then determines (at 510) whether the access terminal is a legacy device or an advanced device that supports the use of mode-dependent identifiers to identify the access terminal during communication over an air interface. If the access terminal is a legacy device, then the mobile station identifier can be provided (at 515) to other network elements such as ASN-GWs, AAA servers, and the like so that these network-side elements can use the identifier to identify the access terminal Alternatively, the network entity may assign a pseudo-identifier that has the same number of bits as the mobile station identifier and then provide (at 515) the pseudo-identifier to the network so that the pseudo-identifier can be used to identify the access terminal without revealing the true mobile station identifier.

Figure 6:
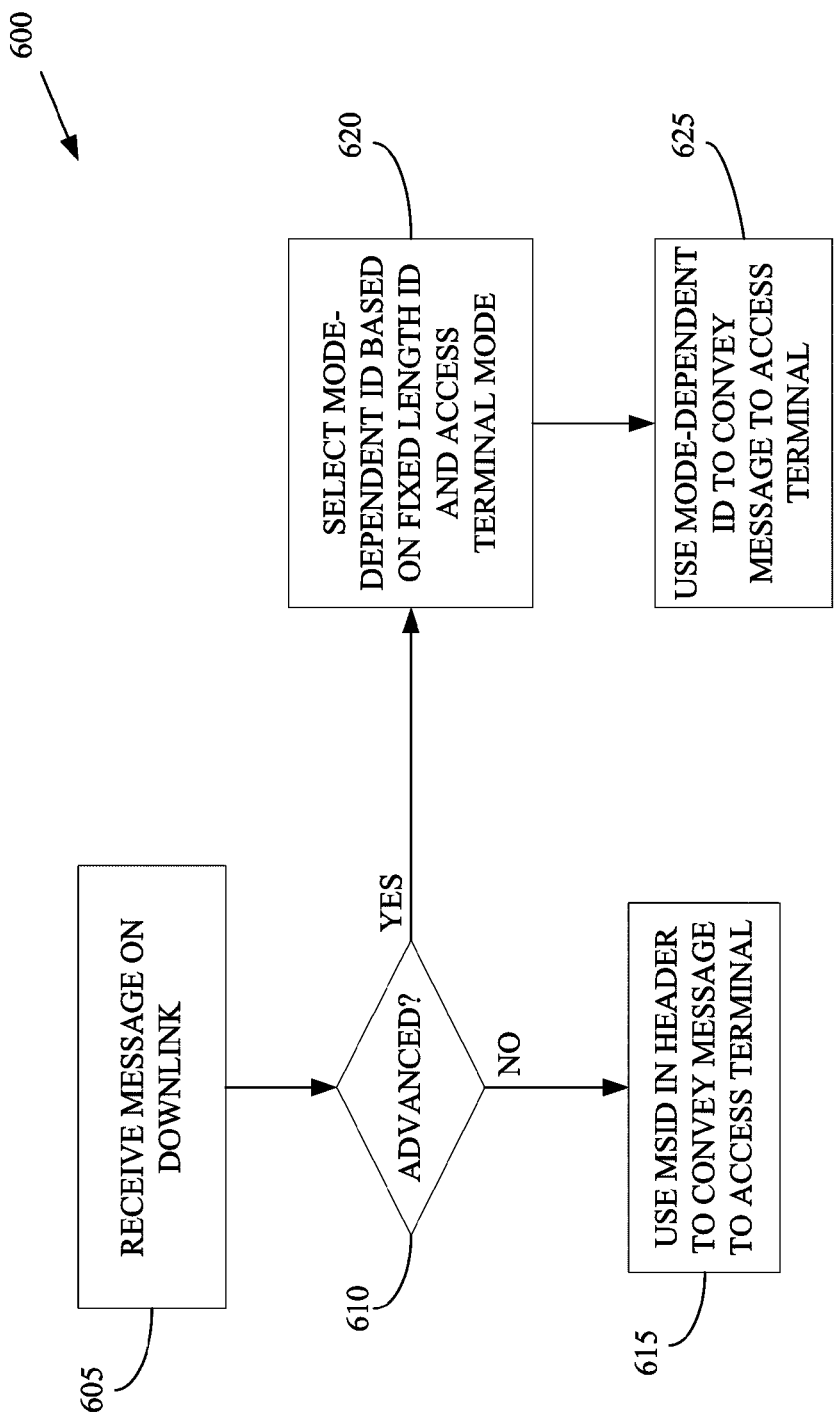
FIG. 6 conceptually illustrates one exemplary embodiment of a method for transmitting downlink messages to access terminals over an air interface.
Figure 7:
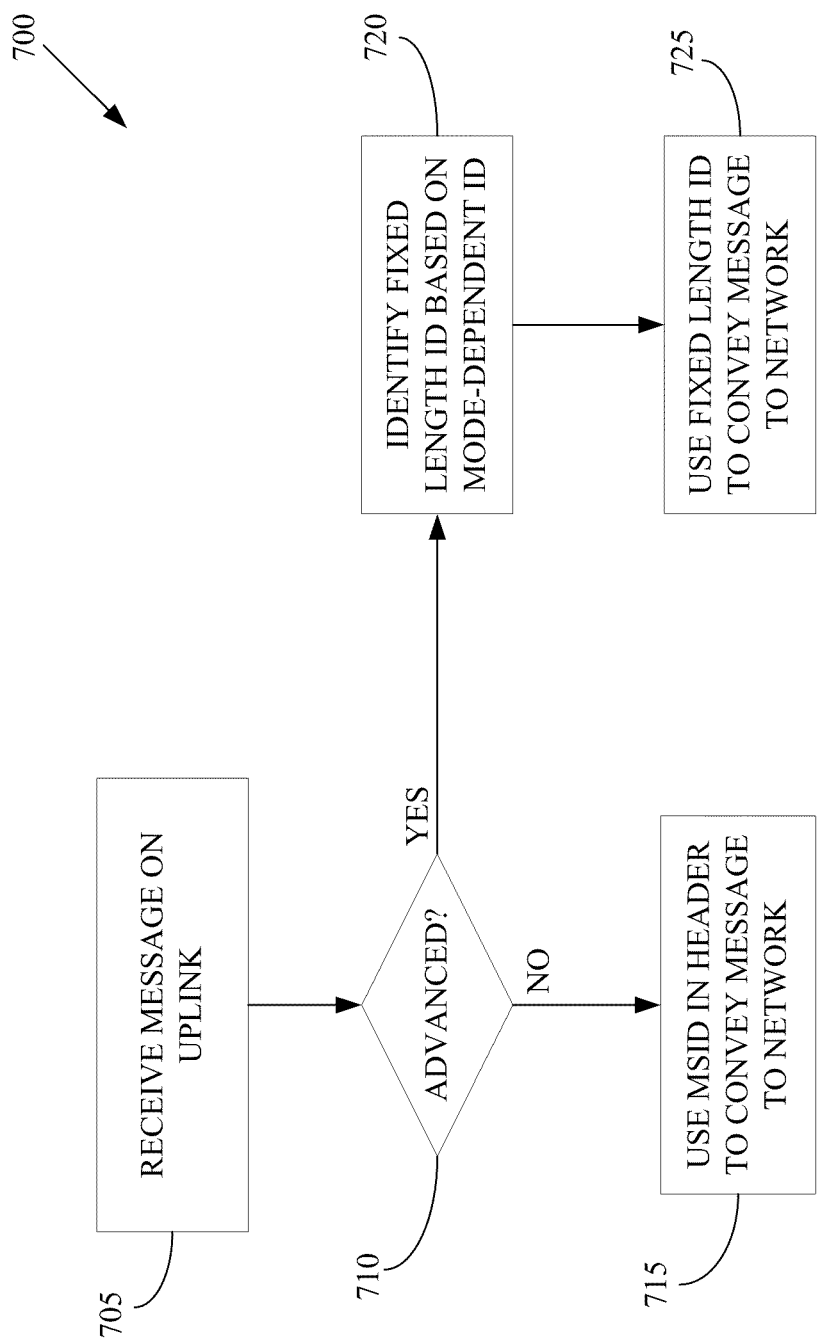
FIG. 7 conceptually illustrates one exemplary embodiment of a method for receiving uplink messages from access terminals at a network over an air interface.

If the network entity determines (at 510) that the access terminal supports mode-dependent identifiers, then a fixed length identifier can be allocated (at 520) to the access terminal The fixed length identifier can then be used to identify the access terminal, e.g., in messages transmitted over interfaces between network elements such as base stations, ASN-GWs, AAA servers, and the like. For example, the fixed length identifier may be a 48 bit identifier allocated to the access terminal. The fixed length identifier may be a random number or may be derived from one or more other identifiers for information associated with the access terminal The fixed length identifier may also be associated (at 525) with the mode-dependent identifiers that are used to identify the access terminal and communications over the air interface. In one embodiment, the network entity creates a database entry including the information that associates the fixed and mode-dependent identifiers for the access terminal The database can be accessed to map or translate between fixed and mode-dependent identifiers for uplink and/or downlink communication. The network entity can then provide (at 530) the fixed length identifier to other elements in the network. In various embodiments, portions of the method 500 may be performed before, concurrently with, or after authentication, authorization, and/or accounting processes are performed for the access terminal FIG. 6 conceptually illustrates one exemplary embodiment of a method 600 for transmitting downlink messages to access terminals over an air interface. In the illustrated embodiment, an entity in the network such as a base station or other access node receives (at 605) a downlink message that is addressed to an access terminal using an identifier in the header of the message. The access node determines (at 610) whether the access terminal is a legacy device or an advanced device that supports the use of mode-dependent identifiers to identify the access terminal during communication over an air interface. If the access terminal is a legacy device, then the identifier in the header of the message is a legacy identifier such as a mobile station identifier. The access node may use the mobile station identifier to convey (at 615) portions of the message to the access terminal For example, the access node may generate a hashed value of the MSID that is used to page the access terminal and once the access node has located the access terminal, some or all of the information in the downlink message may be transmitted over the air interface to the access terminal If the access node determines (at 610) that the access terminal uses mode-dependent identifiers for communication over the air interface, then the identifier in the header of the downlink message may be a fixed length ID that has been allocated to the access terminal The access node may therefore translate or map the fixed length ID to the appropriate mode-dependent ID. In the illustrated embodiment, the access node selects (at 620) a mode-dependent identifier associated with the access terminal using the fixed length identifier and the access terminal mode. For example, the access node may use the fixed length identifier to locate a database entry that indicates the mode-dependent identifiers for the access terminal The access node may then select (at 620) the appropriate mode-dependent identifier based on the operational mode of the access terminal, e.g., the DID may be selected for an idle access terminal The access node may use the selected mode-dependent identifier to convey (at 625) portions of the message to the access terminal For example, the access node may use the mode-dependent identifier (e.g., the DID) to identify the access terminal after a link loss or long inactivity period and once the access node has located the access terminal, some or all of the information in the downlink message may be transmitted over the air interface to the access terminal FIG. 7 conceptually illustrates one exemplary embodiment of a method 700 for receiving uplink messages from access terminals at a network over an air interface. In the illustrated embodiment, an entity in the network such as a base station or other access node receives (at 705) an uplink message from an access terminal The access node determines (at 710) whether the access terminal is a legacy device or an advanced device that supports the use of mode-dependent identifiers to identify the access terminal during communication over an air interface. If the access terminal is a legacy device, then the access terminal can be identified using a legacy identifier such as a mobile station identifier. The access node may use the mobile station identifier to convey (at 715) portions of the message to the network. For example, the access node may use the mobile station identifier to create a header for a message that includes some or all of the information in the uplink message. The message including the header may then be transmitted towards the core and/or access network.

If the access node determines (at 710) that the access terminal uses mode-dependent identifiers for communication over the air interface, then the access node determines or identifies (at 720) a fixed length ID that has been allocated to the access terminal In one embodiment, the access node may translate or map the mode-dependent identifier used by the access terminal for air interface communications to the fixed length identifier used to identify the access terminal in the core and/or access network. In the illustrated embodiment, the access node identifies (at 720) the fixed length identifier based on the mode-dependent identifier associated with the access terminal and the access terminal mode. For example, the access node may use the mode-dependent identifier to locate a database entry that indicates the association between fixed and mode-dependent identifiers for the access terminal The access node may then identify (at 720) the fixed length identifier by mapping the mode-dependent identifier used in the current operational mode of the access terminal to the fixed length identifier indicated in the database entry. The access node may use the selected fixed length identifier to convey (at 725) portions of the message to the core and/or access network. For example, the access node may use the fixed length identifier to create a header for a message that is used to transmit some or all of the information in the uplink message to the core and/or access network, e.g., over an R6 interface.

Embodiments of the fixed length identifier allocation techniques described in the present application may have a number of advantages over techniques that use mode-dependent identifiers for network communications. For example, allocating the fixed length identifier may allow the network to operate consistently with previous network implementations when the length of the fixed length identifier is the same as the length of the legacy mobile station identifier. Moreover, the network can identify both legacy and advanced access terminals using the same length identifiers, which allows the network to preserve and utilize previously defined message formats, thereby facilitating and supporting the evolutionary growth of the network. Paging can be supported for both legacy and advanced access terminals when the fixed length identifiers are used. Moreover implementations of the network entity such as base stations, gateways, paging controllers, AAA servers, and the like may be aligned when a fixed length identifier is implemented for at least core and/or access network-side communication. Allocating fixed length identifiers for core and/or access network-side communication may also improve security by reducing transmissions of permanent identifier associated with the access terminal For example, in some cases the real mobile station identifier is only transmitted as an element of a message sent during initial network entry. After that, a different identifier such as a pseudo-identifier is used for communication over interfaces between the network entities.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
    allocating, at a network entity, a fixed length identifier to an access terminal on initial entry of the access terminal to a network, wherein the access terminal is identified by one of a plurality of mode-dependent identifiers having different lengths, said one mode-dependent identifier being selected based on an operational mode of the access terminal;
    mapping the one of the plurality of mode-dependent identifiers to the fixed length identifier to identify the access terminal in at least one uplink message transmitted within the network; and
    mapping the fixed length identifier to the one of the plurality of mode-dependent identifiers to identify the access terminal in at least one downlink message transmitted over an air interface that originates at an access node and is terminated by the access terminal.

2. The method of claim 1, wherein allocating the fixed length identifier comprises associating the fixed length identifier with the plurality of mode-dependent identifiers for the access terminal.

3. The method of claim 2, wherein the fixed length identifier is allocated by at least one of a network or access node, and wherein allocating the fixed length identifier comprises creating an entry for a database accessible to said at least one of the network or the access node.

4. The method of claim 2, wherein allocating the fixed length identifier comprises allocating a fixed length identifier having a number of bits that corresponds to a number of bits in a legacy fixed length identifier, wherein legacy access terminals use the legacy fixed length identifier to identify the legacy access terminal during communication over the air interface and within the network.

5. The method of claim 1, wherein the mode-dependent identifiers include different numbers of bits used to identify the access terminal in different operational modes, and wherein allocating the fixed length identifier to the access terminal comprises allocating a fixed length identifier that is different than any of the plurality of mode-dependent identifiers used to identify the access terminal for communication over the air interface.

6. The method of claim 1, wherein allocating the fixed length identifier to the access terminal comprises associating the fixed length identifier with at least one context defined for the access terminal.

7. The method of claim 1, further comprising including the fixed length identifier in a header appended to said at least one uplink message.

8. The method of claim 1, further comprising including the one of the plurality of mode-dependent identifiers in a header of said at least one downlink message.

9. The method of claim 1, wherein the network is at least one of a core network or an access network.

10. A method, comprising:
    receiving, at an access node of a network, a first message from the network, wherein the first message comprises a header comprising a fixed length identifier associated with an access terminal;
    mapping, at the access node, the fixed length identifier to one of a plurality of mode-dependent identifiers associated with the access terminal, wherein said one of the plurality of mode-dependent identifiers is selected based upon an operational mode of the access terminal, and wherein the plurality of mode-dependent identifiers have different lengths; and
    transmitting, from the access node, information in the first message over an air interface towards the access terminal in a second message that identifies the access terminal using said one of the plurality of mode-dependent identifiers, wherein the air interface is terminated by the access terminal.

11. The method of claim 10, comprising allocating the fixed length identifier to the access terminal on initial entry of the access terminal to the network.

12. The method of claim 10, wherein receiving the first message comprises receiving a downlink message comprising a header that comprises the fixed length identifier and a message body that comprises at least one type-length-value field.

13. The method of claim 10, wherein mapping the fixed length identifier to said one of the plurality of mode-dependent identifiers comprises mapping the fixed length identifier to said one of the plurality of mode-dependent identifiers using a database entry associated with the access terminal, wherein the database entry includes information associating the fixed length identifier to the plurality of mode-dependent identifiers.

14. The method of claim 10, wherein transmitting information in the first message over the air interface in the second message comprises forming a header for the second message that comprises said one of the plurality of mode-dependent identifiers and forming a message body for the second message that comprises at least a portion of the message received from the network.

15. A method, comprising:
    receiving, at an access node of a network and from an access terminal, a first message over an air interface that is terminated by the access terminal, wherein the first message comprises a header comprising one of a plurality of mode-dependent identifiers associated with the access terminal, wherein said one of the plurality of mode-dependent identifiers is selected based upon an operational mode of the access terminal, and wherein the plurality of mode-dependent identifiers have different lengths;
    mapping, at the access node, said one of the plurality of mode-dependent identifiers to a fixed length identifier associated with the access terminal; and
    transmitting, from the access node, information in the first message to at least one entity in the network in a second message that identifies the access terminal using the fixed length identifier.

16. The method of claim 15, comprising allocating the fixed length identifier to the access terminal on initial entry of the access terminal to the network.

17. The method of claim 15, wherein receiving the first message comprises receiving an uplink message comprising a header that comprises said one of the plurality of mode-dependent identifiers and a message body that comprises at least one type- length-value field.

18. The method of claim 15, wherein mapping said one of the plurality of mode-dependent identifiers to the fixed length identifier comprises mapping said one of the plurality of mode-dependent identifiers to the fixed length identifier using a database entry associated with the access terminal, wherein the database entry includes information associating the fixed length identifier to the plurality of mode-dependent identifiers.

19. The method of claim 15, wherein transmitting information in the first message to said at least one entity in the network in the second message comprises forming a header for the second message that comprises the fixed length identifier and forming a message body for the second message that comprises at least a portion of the first message received over the air interface.

* * * * *